US012647795B2

(12) United States Patent
Yao et al.

(10) Patent No.: US 12,647,795 B2
(45) Date of Patent: Jun. 2, 2026

(54) DYNAMIC SPECTRUM SHARING (DSS) BETWEEN NEW RADIO (NR) AND LONG TERM EVOLUTION (LTE)

(71) Applicant: Apple Inc., Cupertino, CA (US)

(72) Inventors: Chunhai Yao, Beijing (CN); Chunxuan Ye, San Diego, CA (US); Dawei Zhang, Cupertino, CA (US); Sigen Ye, San Diego, CA (US); Hong He, Cupertino, CA (US); Seyed Ali Akbar Fakoorian, San Diego, CA (US); Weidong Yang, San Diego, CA (US); Haitong Sun, Cupertino, CA (US); Huaning Niu, Cupertino, CA (US); Wei Zeng, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 538 days.

(21) Appl. No.: 18/125,966

(22) Filed: Mar. 24, 2023

(65) Prior Publication Data

US 2024/0040386 A1     Feb. 1, 2024

Related U.S. Application Data

(60) Provisional application No. 63/394,181, filed on Aug. 1, 2022.

(51) Int. Cl.
*H04W 16/10* (2009.01)
*H04L 5/00* (2006.01)
(Continued)

(52) U.S. Cl.
CPC ........... *H04W 16/10* (2013.01); *H04L 5/0051* (2013.01); *H04W 16/14* (2013.01); *H04W 72/23* (2023.01)

(58) Field of Classification Search
CPC . H04W 16/10; H04W 16/14; H04W 72/0453; H04W 72/23; H04L 5/0053; H04L 5/0048
See application file for complete search history.

(56) References Cited

U.S. PATENT DOCUMENTS

2022/0182843 A1* 6/2022 Park ...................... H04L 5/0048
2022/0386342 A1* 12/2022 Takeda .................. H04L 5/0048
(Continued)

*Primary Examiner* — Shukri Taha
(74) *Attorney, Agent, or Firm* — Sterne, Kessler, Goldstein & Fox P.L.L.C.

(57) ABSTRACT

A base station can support dynamic spectrum sharing (DSS) between new radio (NR) services and Long Term Evolution (LTE) services. The base station can determine whether a NR physical downlink control channel (PDCCH) control resource set (CORESET) and a LTE PDCCH frequency range are partially overlapped in a frequency domain including a first frequency region and a second frequency region. The partial overlap occurs when the LTE PDCCH frequency range overlaps with the NR PDCCH CORESET in the first frequency region without overlapping with the NR PDCCH CORESET in the second frequency region. In response to a determination that the partial overlap occurs, the base station can map a NR PDCCH or a NR PDCCH demodulation reference signal (DMRS) to resource elements in the second frequency region, and map a LTE cell-specific reference signal (CRS) to a symbol carrying the LTE CRS in the first frequency region.

20 Claims, 12 Drawing Sheets

(51) Int. Cl.
    *H04W 16/14*        (2009.01)
    *H04W 72/23*        (2023.01)

(56)              References Cited

U.S. PATENT DOCUMENTS

2023/0180031 A1 *  6/2023  Takeda .................. H04L 5/0051
                                                        370/329
2023/0337231 A1 * 10/2023  Bae ....................... H04L 1/0072
2023/0354290 A1 * 11/2023  Hathiramani ..... H04W 52/0248

* cited by examiner

Scenario 2

Scenario 1

300

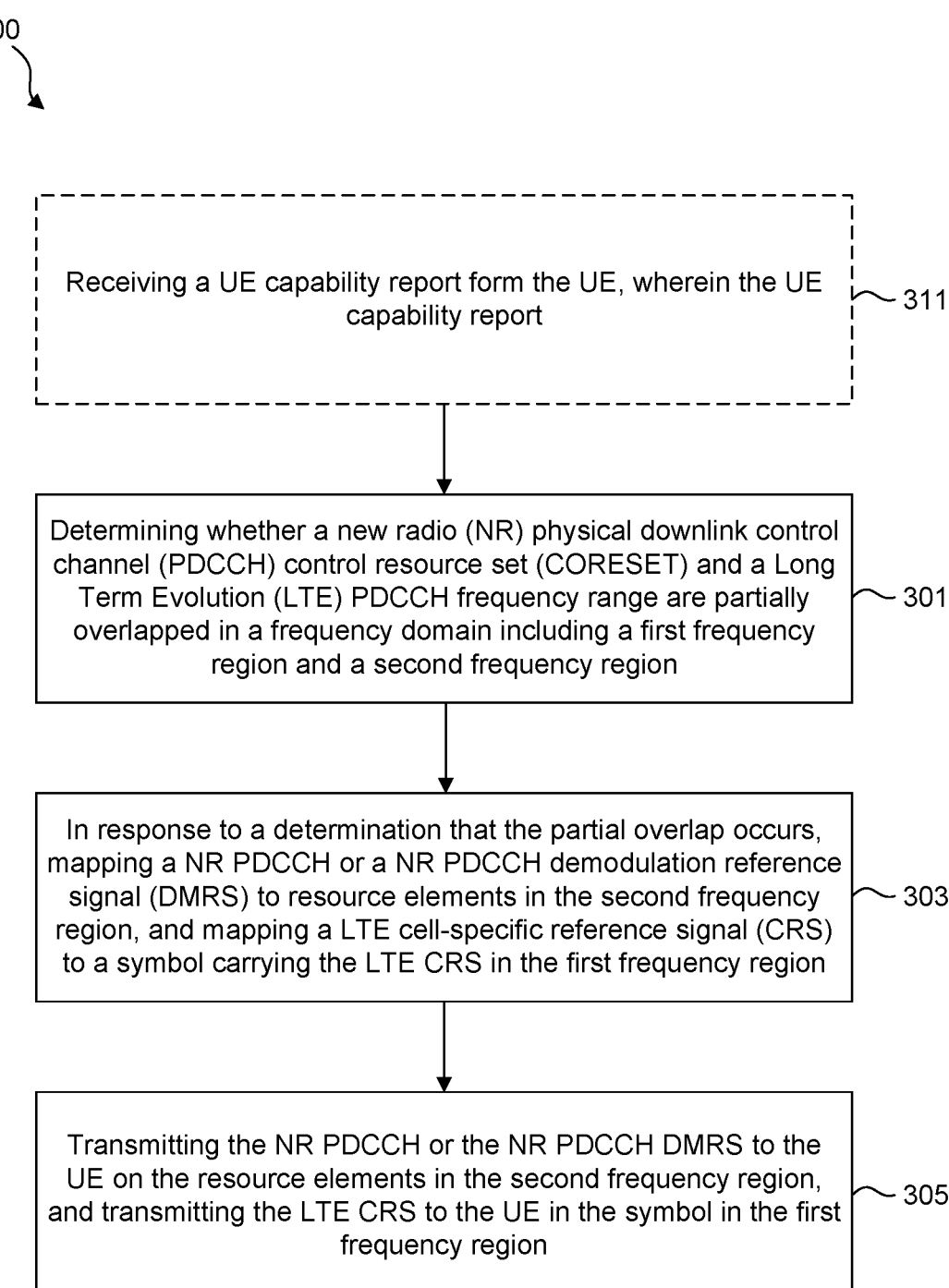

Receiving a UE capability report form the UE, wherein the UE capability report — 311

Determining whether a new radio (NR) physical downlink control channel (PDCCH) control resource set (CORESET) and a Long Term Evolution (LTE) PDCCH frequency range are partially overlapped in a frequency domain including a first frequency region and a second frequency region — 301

In response to a determination that the partial overlap occurs, mapping a NR PDCCH or a NR PDCCH demodulation reference signal (DMRS) to resource elements in the second frequency region, and mapping a LTE cell-specific reference signal (CRS) to a symbol carrying the LTE CRS in the first frequency region — 303

Transmitting the NR PDCCH or the NR PDCCH DMRS to the UE on the resource elements in the second frequency region, and transmitting the LTE CRS to the UE in the symbol in the first frequency region — 305

FIG. 3

Computer System 600

Processor 604

Main Memory 608

User Input/Output Interface(s) 602

User Input/Output Device(s) 603

Secondary Memory 610

Hard Disk Drive 612

Removable Storage Drive 614

Removable Storage Unit 618

Interface 620

Removable Storage Unit 622

Communication Infrastructure 606

Communications Interface 624

Remote device(s), network(s), entity(ies) 627

Communications Path 626

DYNAMIC SPECTRUM SHARING (DSS) BETWEEN NEW RADIO (NR) AND LONG TERM EVOLUTION (LTE)

CROSS-REFERENCE TO RELATED APPLICATIONS

The present application claims the benefit of U.S. Provisional Patent Application No. 63/394,181, filed on Aug. 1, 2022, which is hereby incorporated by reference in its entirety.

FIELD

The described aspects generally relate to wireless communication systems, including dynamic spectrum sharing (DSS) between New Radio (NR) networks and Long Term Evolution (LTE) networks.

RELATED ART

A wireless communication system can include a fifth generation (5G) system, a New Radio (NR) system, a long term evolution (LTE) system, a combination thereof, or some other wireless systems. In addition, a wireless communication system can support a wide range of use cases such as enhanced mobile broad band (eMBB), massive machine type communications (mMTC), ultra-reliable and low-latency communications (URLLC), and enhanced vehicle to anything communications (eV2X). There are challenges in dynamic spectrum sharing (DSS) between NR networks or radio access technology (RAT) and Long Term Evolution (LTE) networks or RAT.

SUMMARY

Some aspects of this disclosure relate to apparatuses and methods for implementing techniques for a base station to support dynamic spectrum sharing (DSS) between New Radio (NR) radio access technology (RAT) for a user equipment (UE) and Long Term Evolution (LTE) RAT for the UE of a wireless communication system. The implemented techniques can be applicable to many wireless systems, e.g., a wireless communication system based on 3rd Generation Partnership Project (3GPP) release 15 (Rel-15), release 16 (Rel-16), release 17 (Rel-17), release 18 (Rel-18), or beyond.

Some aspects of this disclosure relate to a base station. The base station can include a transceiver and a processor communicatively coupled to the transceiver. The transceiver can be configured to communicate with a UE in a wireless system, where the wireless system supports DSS between NR RAT for the UE and LTE RAT for the UE. The processor can be configured to determine whether a NR physical downlink control channel (PDCCH) control resource set (CORESET) and a LTE PDCCH frequency range are partially overlapped in a frequency domain including a first frequency region and a second frequency region. The partial overlap occurs when the LTE PDCCH frequency range overlaps with the NR PDCCH CORESET in the first frequency region without overlapping with the NR PDCCH CORESET in the second frequency region. In response to a determination that the partial overlap occurs, the processor can be configured to map a NR PDCCH or a NR PDCCH demodulation reference signal (DMRS) to resource elements in the second frequency region, and map a LTE cell-specific reference signal (CRS) to a symbol carrying the LTE CRS in the first frequency region. In addition, the processor can be configured to transmit the NR PDCCH or the NR PDCCH DMRS to the UE on the resource elements in the second frequency region, and transmit the LTE CRS to the UE in the symbol in the first frequency region.

According to some aspects, there can be no NR PDCCH DMRS transmitted in the first frequency region where the LTE CRS to the UE is transmitted. In some embodiments, there can be no NR PDCCH DMRS transmitted in the symbol carrying the LTE CRS in the first frequency region.

In some embodiments, the NR PDCCH DMRS transmitted in the second frequency region can be a first NR PDCCH DMRS, and the processor can be configured to map a second NR PDCCH DMRS to the symbol carrying the LTE CRS in the first frequency region, where resource elements of the symbol for the LTE CRS puncture resource elements for the second NR PDCCH DMRS colliding, with the resource elements of the symbol for the LTE CRS in the symbol. In addition, the processor can be configured to determine whether to transmit the second NR PDCCH DMRS on resource elements overlapping with LTE CRS based on a capability of the UE, and indicate to the UE the second NR PDCCH DMRS is transmitted to the UE in the symbol carrying the LTE CRS in the first frequency region.

In some embodiments, when the LTE CRS is transmitted in the symbol in the first frequency region, the LTE CRS is transmitted in the symbol without mapping any NR PDCCH RE in the symbol. In some embodiments, the NR PDCCH transmitted in the second frequency region can be a first NR PDCCH, and the processor can be configured to map a second NR PDCCH to the symbol carrying the LTE CRS in the first frequency region, and transmit the LTE CRS in the symbol in the first frequency region together with the second NR PDCCH resource element in the symbol, where the LTE CRS resource elements puncture NR PDCCH resource elements in the symbol. In some embodiments, the second NR-PDCCH can span at least 2 consecutive symbols with at least 1 symbol not overlapping with LTE-CRS REs.

According to some aspects, the processor can be configured to receive a UE capability report from the UE, where the UE capability report includes a capability to support different sizes of LTE bandwidth and the NR PDCCH CORESET, a capability to support one or two overlapping LTE CRS rate matching patterns in the PDCCH CORESET, a capability to support maximum non-overlapping CRS rate matching patterns in the PDCCH CORESET, and a UE channel estimation capability. In some embodiments, the UE channel estimation capability can include a capability for the UE to support a NR PDCCH DMRS only in a clean symbol, a capability for the UE to support the NR PDCCH DMRS in a clean symbol and a polluted NR PDCCH DMRS contained in a colliding symbol including both the NR PDCCH DMRS and a LTE CRS, a capability for the UE to support puncturing the polluted NR PDCCH DMRS in channel estimation, a capability for the UE to use all NR PDCCH DMRS REs for channel estimation including the polluted DMRS REs, and a capability for the UE to use all NR PDCCH DMRS REs for channel estimation including cancelling the LTE CRS for polluted NR PDCCH DMRS REs.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIG. 3 illustrates an example process performed by a base station to support DSS between NR and LTE in a wireless communication system, according to some aspects of the disclosure.

Figures 1A, 1B:
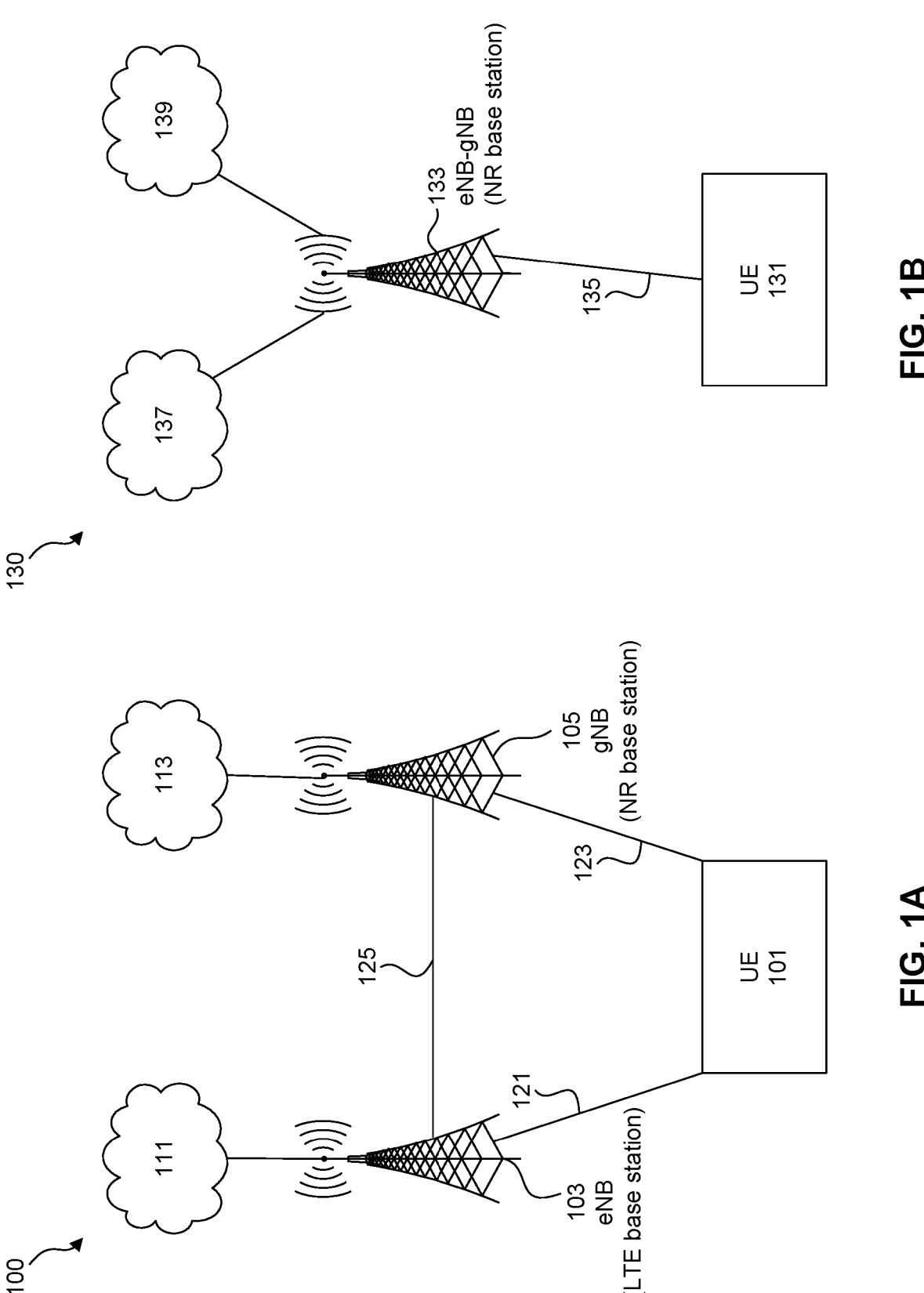
FIGS. 1A-1D illustrate wireless systems including a base station to support dynamic spectrum sharing (DSS) between New Radio (NR) and Long Term Evolution (LTE) in a wireless communication system, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

The 5G new radio (NR) systems may provide users with enhanced experiences through faster data speeds, higher capacity, lower latency, and higher reliability, in addition to supporting a wide range of services such as enhanced mobile broadband (eMBB), ultra-reliable low-latency communications (URLLC), and massive machine type communications (mMTC). However, long term evolution (LTE) systems providing 4G services may still operate in the current communications market with a large number of users. Therefore, allocating LTE carrier spectrums specifically only for NR users may significantly reduce the service quality to the large number of LTE users. Accordingly, it is important to find a smooth transition path from 4G LTE services to 5G NR services. The LTE-NR dynamic spectrum sharing (DSS) between NR radio access technology (RAT) and LTE RAT emerges as a technology that allows service providers to deploy LTE and NR in the same carriers and bands to facilitate a smooth transition from the 4G LTE services to 5G NR services.

However, NR physical downlink control channel (PDCCH) can be a bottleneck for DSS and the situation may become worse with increasing NR traffics. There may have various restrictions on the transmission of NR PDCCH in a LTE frequency range. For example, the current standard may not allow more than one NR PDCCH symbol within the first 3 symbols of a slot in cells with a number of LTE cell-specific reference signal (CRS) ports. In addition, transmission of a LTE CRS from neighboring LTE cells can cause interference to NR cells. In order to mitigate the interference, it may be useful to have multiple LTE CRS rate matching patterns, which are not offered by the currently available two overlapping LTE rate matching patterns.

Embodiments herein present techniques to increase the resource utilization and increase the NR PDCCH capacity for DSS in the LTE frequency range. For example, embodiments may allow NR PDCCH being mapped or transmitted in symbols overlapping with LTE CRS in the LTE frequency range. In addition, embodiments may support a UE to report its capability to receive NR PDCCH in a LTE CRS symbol. In addition, the UE can report its channel estimation capability, and capability for support overlapping CRS rate matching patterns for NR PDSCH receptions.

FIGS. 1A-1D illustrate wireless systems, such as a wireless system 100, and a wireless system 130, including a base station to support DSS between NR and LTE in a wireless communication system, according to some aspects of the disclosure. Wireless systems, such as system 100 or system 130, are provided for the purpose of illustration only and do not limit the disclosed aspects.

In some embodiments, as shown in FIG. 1A, wireless system 100 can include, but is not limited to, UE 101, a base station 103, a base station 105, a core network 111, and a core network 113, all communicatively coupled to each other. Base station 103 may be an E-UTRAN Node B (eNB) for LTE services and coupled to core network 111 that may be a LTE core network. Similarly, base station 105 may be a gNodeB (gNB) for NR services and coupled to core network 113 that may be a NR core network. UE 101 communicates with base station 103 through a communication link 121, and communicates with base station 105 through a communication link 123, while base station 103 and base station 105 can communicate with each other through a communication link 125. There can be other network entities, e.g., network controller, a relay station, not shown. A wireless system can be referred to as a wireless network, a wireless communication system, or some other names known to a person having ordinary skill in the art.

In some embodiments, as shown in FIG. 1B, wireless system 130 can include, but is not limited to, UE 131, a base station 133, a core network 137, and a core network 139, all communicatively coupled to each other. Base station 133 may function as both an eNB for LTE services and coupled to core network 137 that may be a LTE core network, and a gNB for NR services and coupled to core network 139 that may be a NR core network. UE 131 communicates with base station 133 through a communication link 135.

In some aspects, through base station 103 communicating with core network 111, and base station 105 communicating with core network 113, wireless communications system 100 supports both LTE networks and services and New Radio (NR) networks and services. Similarly, wireless system 130 can also support both LTE and NR networks and services. Functions performed by system 100 can be similarly performed by system 130. Description below may mainly focuses on system 100, however techniques described herein can also be applicable to system 130, as will be understood by those skilled in the art based on the description provided herein.

According to some aspects, UE 101, and similarly UE 131, can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103 or base station 105 can also be called other names, such as a base transceiver system (BTS), an access point (AP), a transmission/reception point (TRP), a 5G node B (NB), or some other equivalent terminology. Base station 103 or base station 105 may include subcomponents such as an access network entity or an access node controller (ANC), radio heads, smart radio heads. Base station 103 or base station 105 may include one or more antenna panels.

In some embodiments, an LTE network supported by system 100 may be an LTE network, an LTE-Advanced (LTE-A) network, an LTE-A Pro network. In some aspects, the wireless communications system 100 may support NR services such as enhanced mobile broad band (eMBB), massive machine type communications (mMTC), ultra-reliable and low-latency communications (URLLC), enhanced vehicle to anything communications (eV2X), or other NR services. The NR network can be a non-standalone (NSA) architecture. In some embodiments, techniques disclosed herein can be applicable to standalone (SA) architecture as well. The main difference between NSA NR network and SA NR network is that the NSA architecture is based and depends on the LTE core network, while the SA architecture uses a novel next-generation core network, not depending of any LTE infrastructure. When the NR network has an NSA architecture, the NR service may be based on the LTE core network and uses LTE-based interfaces. Base station 105 may support LTE-based interfaces and acts as a secondary node, while the base station 103 acts as a primary or master node. Base station 103, which is an eNB, communicates directly with base station 105, which is a gNB, and both communicate directly with the Evolved Packet Core (EPC).

In some embodiments, UE 101 communicates with base station 103, which can be an eNB of a LTE network, via communication link 121 over one or more carriers within a LTE frequency range, which may be a set of radio frequency spectrum resources having a defined physical layer structure for supporting the communication link 121. UE 101 may be configured with multiple downlink component carriers and one or more uplink component carriers according to a carrier aggregation configuration. Carrier aggregation may be used with both frequency division duplexing (FDD) and time division duplexing (TDD) component carriers. An example LTE frequency range can be shown as a frequency range 142 shown in FIG. 1C, or a frequency range 153 shown in FIG. 1D.

In some embodiments, UE 101 communicates with base station 105, which can be a gNB of a NR network, via communication link 123 over one or more carriers within a NR frequency domain, which may be a set of radio frequency spectrum resources having a defined physical layer structure for supporting the communication link 123. An example NR frequency domain can be shown as a frequency domain 141 shown in FIG. 1C, or a frequency domain 151 shown in FIG. 1D.

In some embodiments, frequency domain 141, frequency range 142, frequency domain 151, and frequency range 153 may be in the range of 300 megahertz (MHz) to 300 gigahertz (GHz). One or more numerologies for a carrier may be supported, where a numerology may include a subcarrier spacing and a cyclic prefix.

Figure 1D:
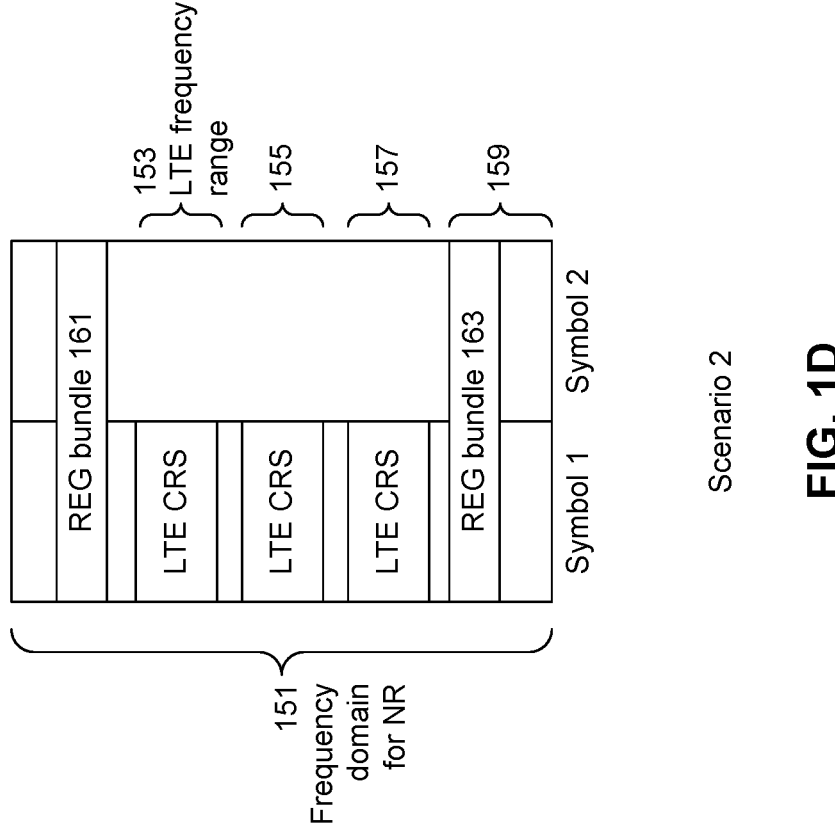
Figure 1C:
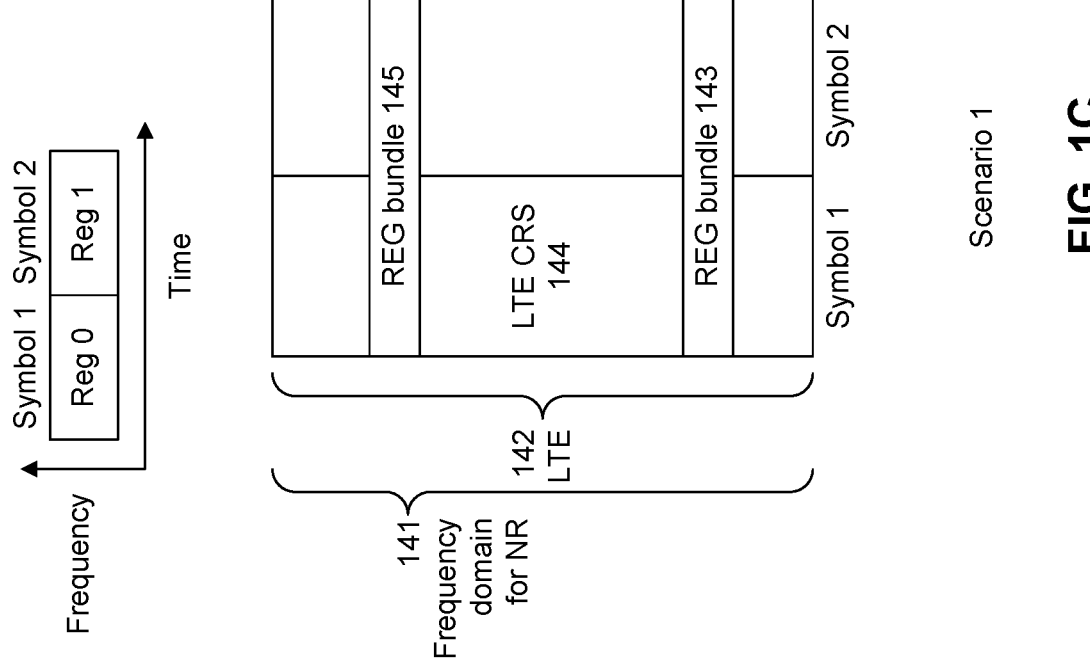

In some embodiments, the time intervals for wireless communications between UE 101 and base stations 103 or base station 105 may be described in multiples of a basic time unit. Time intervals of a communications resource may be organized according to radio frames each having a specified duration (e.g., 10 milliseconds (ms)). Each radio frame may be identified by a system frame number (SFN) (e.g., ranging from 0 to 1023). Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods, such as symbol 1 and symbol 2 as shown in FIG. 1C and FIG. 1D. In some wireless communications systems 100, a slot may further be divided into multiple mini-slots containing one or more symbols. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected.

In some embodiments, as shown in FIG. 1C, frequency domain 141 for NR service and frequency range 142 for LTE service can be completely overlap. LTE CRS 144 can be carried by a symbol in various subcarriers of frequency range 142 for LTE service. In addition, resource element group (REG) 143 of NR and REG 145 of NR can be carried over frequency domain 141 for NR service. The complete overlap between frequency domain 141 for NR service and frequency range 142 for LTE service may be referred to as scenario 1. In scenario 1, NR PDCCH control resource set (CORESET) and LTE PDCCH are fully overlapped in the frequency domain. NR CORESET carrying NR downlink control data, e.g. physical downlink control channel (PDCCH), can be configured in terms of resource blocks (RBs) and symbols, which can be utilized in LTE-NR co-existence.

In some embodiments, as shown in FIG. 1D, frequency domain 151 for NR service and frequency range 153 for LTE service can be partially overlapped. There can be multiple frequency ranges for LTE service within frequency domain 151 for NR service, such as frequency range 153 for LTE, frequency range 155 for LTE, and frequency range 157 for LTE, where the frequency ranges for LTE can be separated by a gap. In addition, frequency domain 151 can further include a frequency range 159 that does not overlap with frequency range 153 for LTE at all. In some embodiments, frequency range 153 can be viewed as a first frequency region of frequency domain 151, while other frequency range of frequency domain 151, such as frequency range 159, frequency range 157, frequency range 155, or any part of them, can be referred to as a second frequency region without overlapping with frequency range 153 for LTE. Therefore, frequency range 153 for LTE can be referred as partially overlapping with frequency domain 151 for NR services. In some aspects, NR frequency domain 151 may encapsulate the LTE frequency range 153 on a smaller sub-band, and LTE frequency range 153 partially overlaps with frequency domain 151 for NR, which may be referred to as scenario 2.

In some embodiments, UE 101 can concurrently communicate on the NR frequency domain 151 with base station 105 and the LTE frequency range 153 with the base station 103 (e.g., in a same frequency spectrum). In one aspect, UE 101 may be tuned to the full carrier bandwidth of NR frequency domain 151 to monitor for both NR messages and LTE messages. Some resource blocks in the carrier bandwidth of frequency domain 151 may be scheduled for NR communications and some resource blocks in the carrier bandwidth of frequency range 153 may be scheduled for LTE communications. In some cases, the base station 105 or base station 103 may perform the scheduling in a single control channel that can schedule both NR and LTE communications.

Hence, in scenario 2, NR PDCCH CORESET and LTE PDCCH are partially overlapped in the frequency domain, and the LTE bandwidth is smaller than the NR bandwidth. Accordingly, LTE PDCCH frequency range 153 overlaps with the NR PDCCH CORESET in the first frequency region without overlapping with the NR PDCCH CORESET in the second frequency region (e.g., frequency range 159). LTE CRS can be carried by a symbol in various subcarriers of frequency range 153 for LTE, in various subcarriers of frequency range 155 for LTE, or various subcarriers of frequency range 157 for LTE. In addition, REG 161 of NR and REG 163 of NR can be carried over frequency domain 151 for NR service. Within a REG bundle, NR PDCCH and NR PDCCH DMRS mapping to physical resource elements could be different for different REGs. For the overlapped region, NR PDCCH and PDCCH DMRS mapping to physical resource elements could be different for different REG within a REG bundle. For non-overlapped region, NR PDCCH and PDCCH DMRS mapping to physical resource elements could be same or different for different REG within a REG bundle.

In some embodiments, NR CORESET with up to three contiguous symbols can be configured beyond the first three OFDM symbols, which relaxes the limitation that LTE and NR PDCCH should share the first three OFDM symbols and hence provides more PDCCH capacity to both LTE and NR.

Figure 2A:
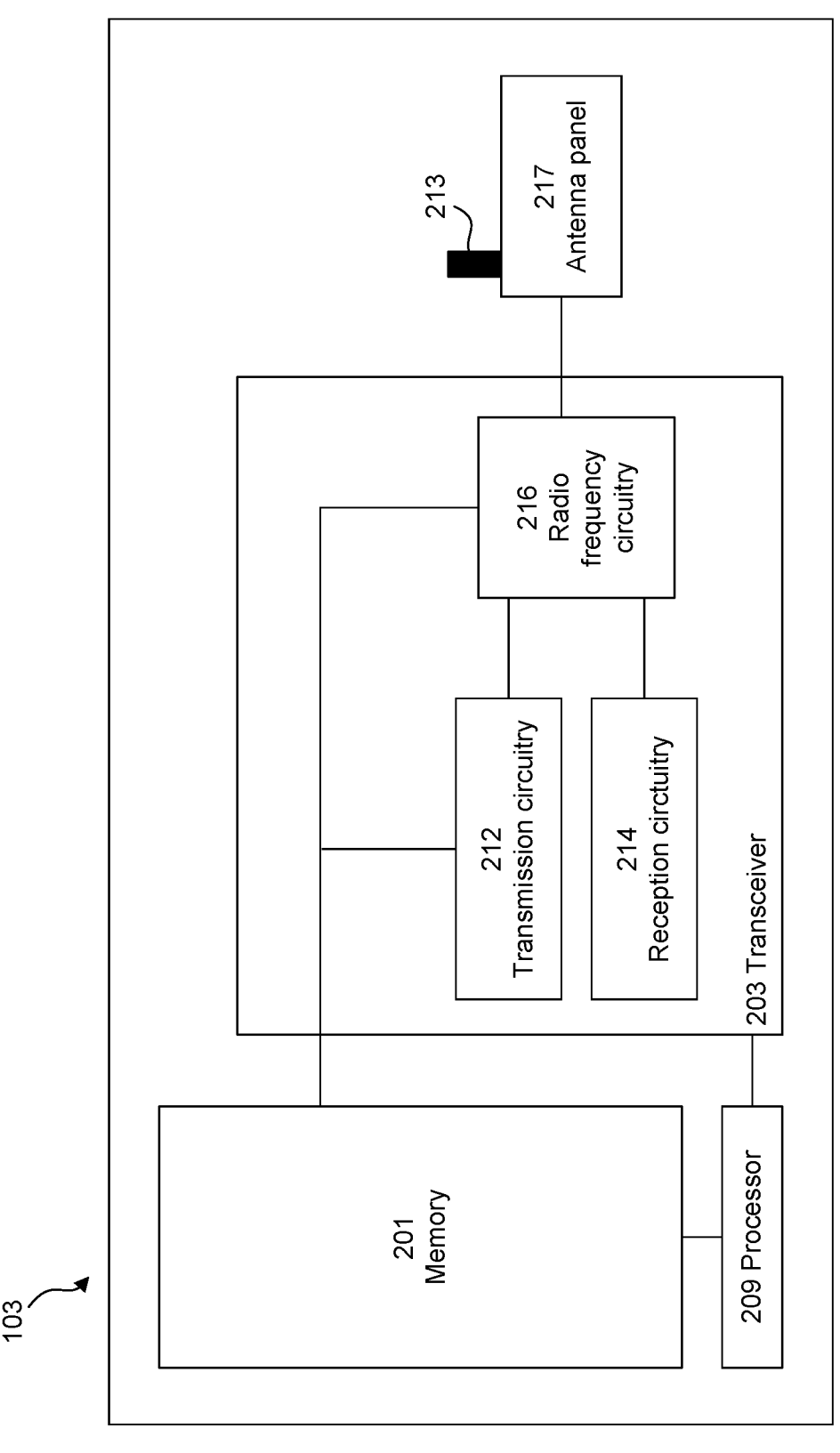
FIGS. 2A-2B illustrate a block diagram of a base station to support DSS between NR and LTE in a wireless communication system, according to some aspects of the disclosure.

According to some aspects, base station 103 or base station 105 can be implemented according to a block diagram as illustrated in FIG. 2A. Base station 103 can be describe as an example, while similar implementations can be applied to other base stations such as base station 105 and base station 133. Referring to FIG. 2A, base station 103 can have antenna panel 217 including one or more antenna elements to form various transmission beams coupled to a transceiver 203 and controlled by a processor 209. Transceiver 203 and antenna panel 217 can be configured to enable wireless communication in a wireless network. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory 201, which are further coupled to the transceiver 203. Various data can be stored in memory 201.

In some embodiments, memory 201 can include instructions, that when executed by the processor 209 perform operations described herein, e.g., operations for supporting DSS between NR and LTE in a wireless communication system. Alternatively, the processor 209 can be "hard-coded" to perform DSS between NR and LTE functions described herein.

Figure 2B:
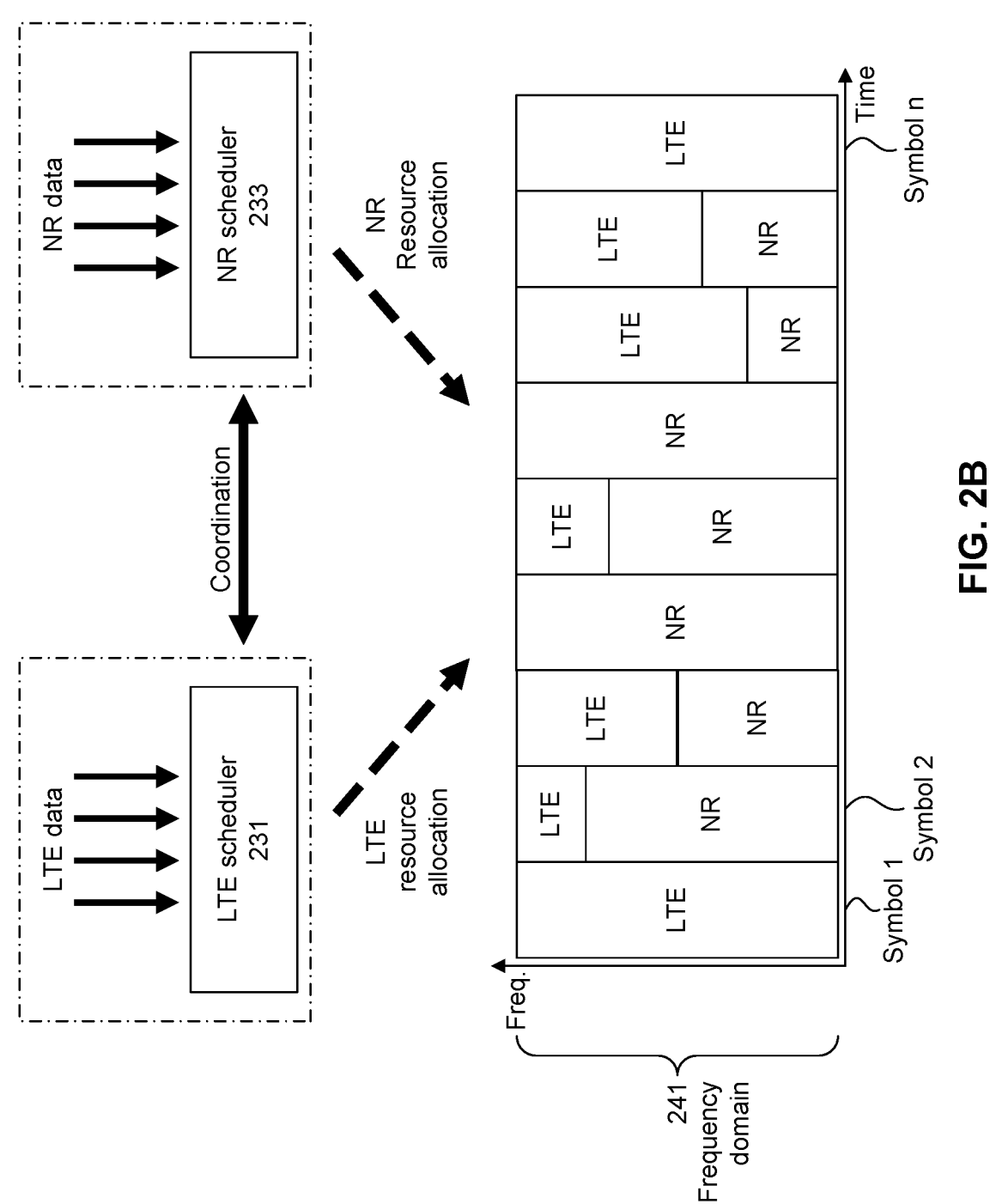

In some embodiments, as shown in FIG. 2B, processor 209 can be configured to support DSS between NR and LTE in a wireless communication system by implementing a LTE scheduler 231 and a NR scheduler 233 to coordinate with each other in order to interchange traffic status or resource sharing status, as well as dynamically assign available resources in a synchronized manner. For example, LTE scheduler 231 can receive LTE data and allocate one or more resources to carry such LTE data, while NR scheduler 233 can receive NR data and allocate resource to carry such NR data. The resources allocated for LTE data and NR data may be by DSS within a shared frequency domain 241 and multiple symbols, such as symbol 1, symbol 2, and symbol n. Through sophisticated coordination between schedulers, LTE resource allocation increases and NR resource allocation decreases when LTE traffic peaks; and vice versa when NR traffic peaks. This enables dynamic resource allocation for instantaneous NR traffic bursts, as well as for the steady increase in NR demand over time. For example, symbol 1 of frequency domain 241 is exclusively used for LTE, whereas symbol 2 is shared between LTE and NR in the frequency domain. Other symbols may be exclusively NR. In some embodiments, both LTE scheduler 231 and NR scheduler 233 can be implemented by processor 209 in one base station, such as base station 133. In some embodiments, LTE scheduler 231 can be implemented by a processor within base station 103 and NR scheduler 233 can be implemented by a processor within base station 105.

In some embodiments, processor 209 can be configured to support DSS between NR and LTE in a wireless communication system by implementing a process 300 shown in FIG. 3. According to some aspects, all or part of process 300 can be performed by base station 103, base station 105, base station 133, individually or in coordination with other base station to support DSS between NR and LTE in a wireless communication system.

Figure 4A:
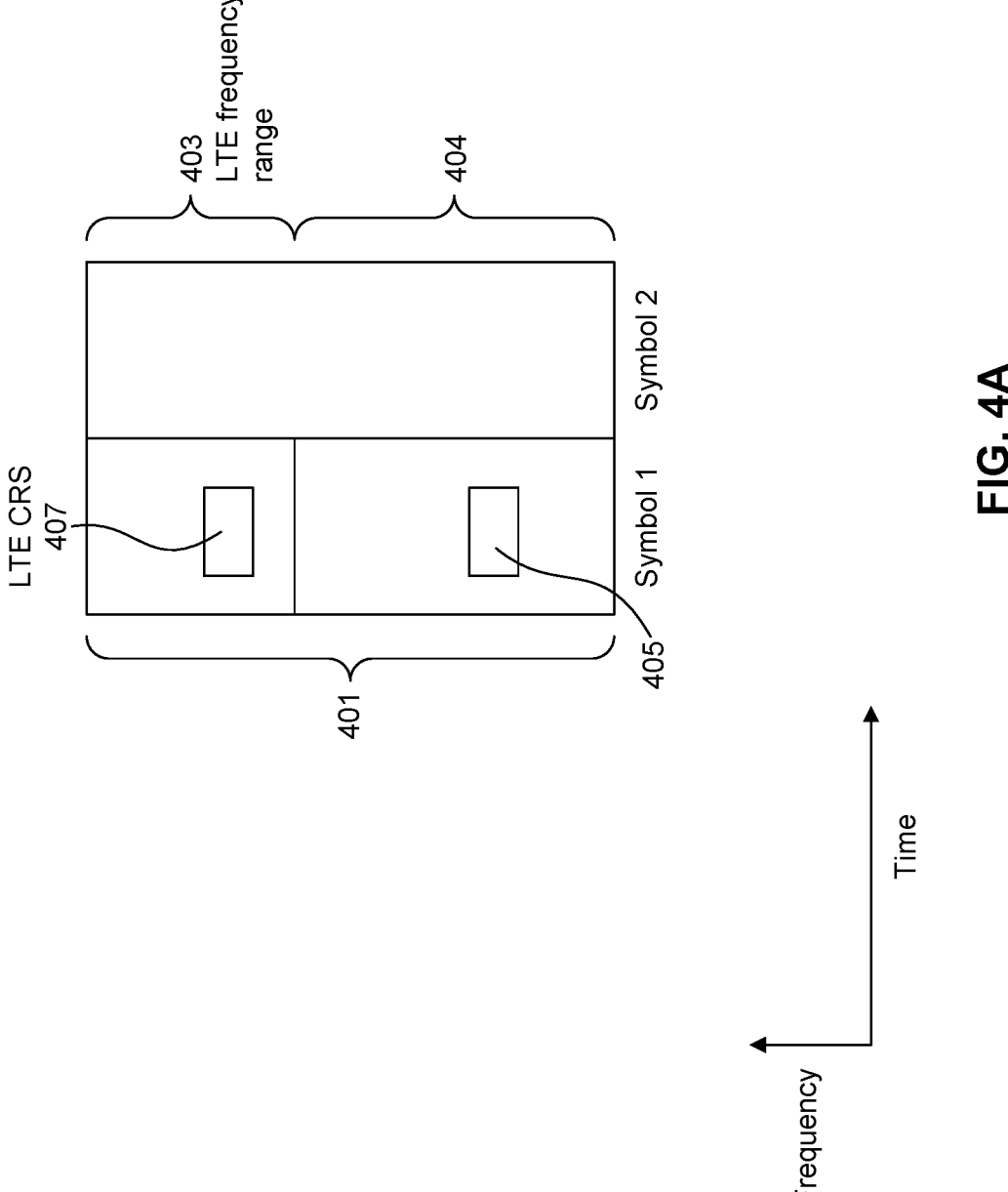
FIGS. 4A-4E illustrate example processes performed by a base station to map physical resource elements of NR physical downlink control channel (PDCCH) to symbols of LTE cell-specific reference signal (CRS) to support DSS between NR and LTE in a wireless communication system, according to some aspects of the disclosure.

At 301, a base station can determine whether a NR PDCCH CORESET and a LTE PDCCH frequency range are partially overlapped in a frequency domain including a first frequency region and a second frequency region. The partial overlap occurs when the LTE PDCCH frequency range overlaps with the NR PDCCH CORESET in the first frequency region without overlapping with the NR PDCCH CORESET in the second frequency region. For example, as shown in FIG. 4A, base station 103 can determine the LTE PDCCH frequency range to be frequency range 403, which can be viewed as a first frequency region of frequency domain 401 of NR services, and further determine NR PDCCH CORESET is included in a second frequency region 404, which does not overlap with frequency range 403, e.g., the first frequency region of frequency domain 401.

At 303, in response to a determination that the partial overlap occurs, a base station can map a NR PDCCH or a NR PDCCH DMRS to resource elements (REs) in the second frequency region, and map a LTE CRS to a symbol carrying the LTE CRS in the first frequency region. For example, as shown in FIG. 4A, base station 103 can map a NR PDCCH or a NR PDCCH DMRS to resource elements 405 in the second frequency region 404, and map a LTE CRS to resource elements 407 of a symbol, e.g., symbol 1, carrying the LTE CRS in the first frequency region 403.

At 305, a base station can transmit the NR PDCCH or the NR PDCCH DMRS to the UE on the resource elements in the second frequency region, and transmit the LTE CRS to the UE in the symbol in the first frequency region. For example, base station 103 can transmit the NR PDCCH or the NR PDCCH DMRS to the UE on the resource elements 405 in the second frequency region 404, and transmit the LTE CRS to the UE in the resource elements 407 of a symbol in the first frequency region 403.

Operations performed at 303 can map a NR PDCCH or a NR PDCCH DMRS to resource elements in the second frequency region, and map a LTE CRS to a symbol carrying the LTE CRS in the first frequency region 403 that is disjoint from the second frequency region 404. In order to improve the efficiency for NR services, a NR PDCCH or a NR PDCCH DMRS may be mapped to resource elements or symbols within the first frequency region where the LTE CRS is carried by resource elements of symbols within the first frequency region.

In some embodiments, a base station can further adopt different mechanisms to determine how to map a NR PDCCH or NR PDCCH DMRS to symbols or resource elements of symbols within the first frequency region. In some embodiments, there can be no NR PDCCH DMRS or NR PDCCH transmitted in the first frequency region 403 where the LTE CRS to the UE is transmitted by resource elements 407, which may be as shown in FIG. 4A. However, having no NR PDCCH DMRS or NR PDCCH transmitted in the first frequency region 403 may limit the capacity of the NR services.

In some embodiments, there is no NR PDCCH DMRS transmitted in the symbol carrying the LTE CRS in the first frequency region, but NR PDCCH DMRS can be mapped to symbols in the first frequency region not carrying the LTE CRS. As shown in example 410 of FIG. 4B, symbol 1 includes resource elements carrying LTE CRS 413. Therefore, no NR PDCCH DMRS is transmitted in symbol 1 carrying the LTE CRS 413 in the frequency region 411. In example 412, NR PDCCH DMRS 417 can be mapped to resource elements at symbol 2, but no NR PDCCH DMRS 417 is mapped to symbol 1. Similarly, in example 412, NR PDCCH DMRS 415 can be mapped to resource elements at symbol 2, but no NR PDCCH DMRS 415 is mapped to symbol 1. Similarly in example 412, NR PDCCH DMRS 419 can be mapped to resource elements at symbol 2, but no NR PDCCH DMRS 419 is mapped to symbol 1. In some embodiments, NR PDCCH DMRS 415 may initially occupy two symbols at symbol 1 and symbol 2, where NR PDCCH DMRS 415 collides with LTE CRS 413 at symbol 1. Accordingly, NR PDCCH DMRS 415 at symbol 1 is discarded, and NR PDCCH DMRS 415 in only carried at symbol 2 as shown in example 412. Alternatively, NR PDCCH DMRS 417 may initially occupy two symbols at symbol 1 and symbol 2, and NR PDCCH DMRS 417 does not collide with any LTE CRS. However, NR PDCCH DMRS 417 at symbol 1 is still discarded, and NR PDCCH DMRS 417 in only carried at symbol 2 as shown in example 412, because symbol 1 is used to carry LTE CRS.

In some embodiments, a base station can map a NR PDCCH DMRS to the symbol carrying the LTE CRS in the first frequency region, where resource elements of the symbol for the LTE CRS puncture resource elements for the NR PDCCH DMRS colliding with the resource elements of the symbol for the LTE CRS. As shown in example 428 of FIG. 4B, NR PDCCH DMRS 425 may initially occupy two symbols at symbol 1 and symbol 2, where NR PDCCH DMRS 425 collides with LTE CRS 413 at symbol 1. Accordingly, NR PDCCH DMRS 425 is still mapped to symbol 1 carrying the LTE CRS 413. However, the base station is configured so that resource elements 429 of symbol 1 for the LTE CRS 413 puncture resource elements for the NR PDCCH DMRS 425 that collides with the resource elements of the symbol for the LTE CRS 413. Hence, in the colliding resource elements 429, the LTE CRS 413 is still mapped and transmitted to the UE, and NR PDCCH DMRS 425 is not transmitted on such resource elements since the LTE CRS punctures the NR PDCCH DMRS. As a result, NR PDCCH DMRS 427 is transmitted on symbol 1 in addition to the LTE CRS 413, but NR PDCCH DMRS 427 is only transmitted on resource elements of symbol 1 where no LTE CRS 413 is transmitted on such resource elements. Accordingly, the LTE service quality is maintained without any interruption. In addition, when there is no colliding resource elements, NR PDCCH DMRS 427 can be transmitted in both symbol 1 and symbol 2 as shown in example 428.

In some embodiments, a base station can determine whether to transmit the NR PDCCH DMRS on resource elements overlapping with LTE CRS based on a capability of the UE, and indicate to the UE the second NR. PDCCH DMRS is transmitted to the UE in the symbol carrying the LTE CRS in the first frequency region. As shown example 430 of FIG. 4B, NR PDCCH DMRS 435 may initially occupy two symbols at symbol 1 and symbol 2, where NR PDCCH MARS 435 collides with LTE CRS 413 at symbol 1. As a result, the base station can transmit NR PDCCH DMRS 435 and discard LTE CRS 413 at symbol 1 as shown in example 430. Under this option, the NR service is preserved while the LTE CRS is discarded.

The above descriptions are provided for NR. PDCCH DMRS as examples. Similar mechanisms can be applicable to NR PDCCH. In some embodiments, when the LTE CRS is transmitted in the symbol in the first frequency region, the LTE CRS is transmitted in the symbol without mapping any NR PDCCH RE in the symbol, as shown in examples 410 and 412. In some embodiments, the base station can map a NR PDCCH to the symbol carrying the LTE CRS in the first frequency region, and transmit the LTE CRS in the symbol in the first frequency region together with the NR PDCCH resource element in the symbol at the first frequency region, where the LTE CRS resource elements puncture NR PDCCH resource elements in the symbol carrying RE 429. In some embodiments, the NR-PDCCH can span at least 2 consecutive symbols with at least 1 symbol not overlapping with LTE-CRS REs as shown in examples 428 and 430.

Figure 4B:
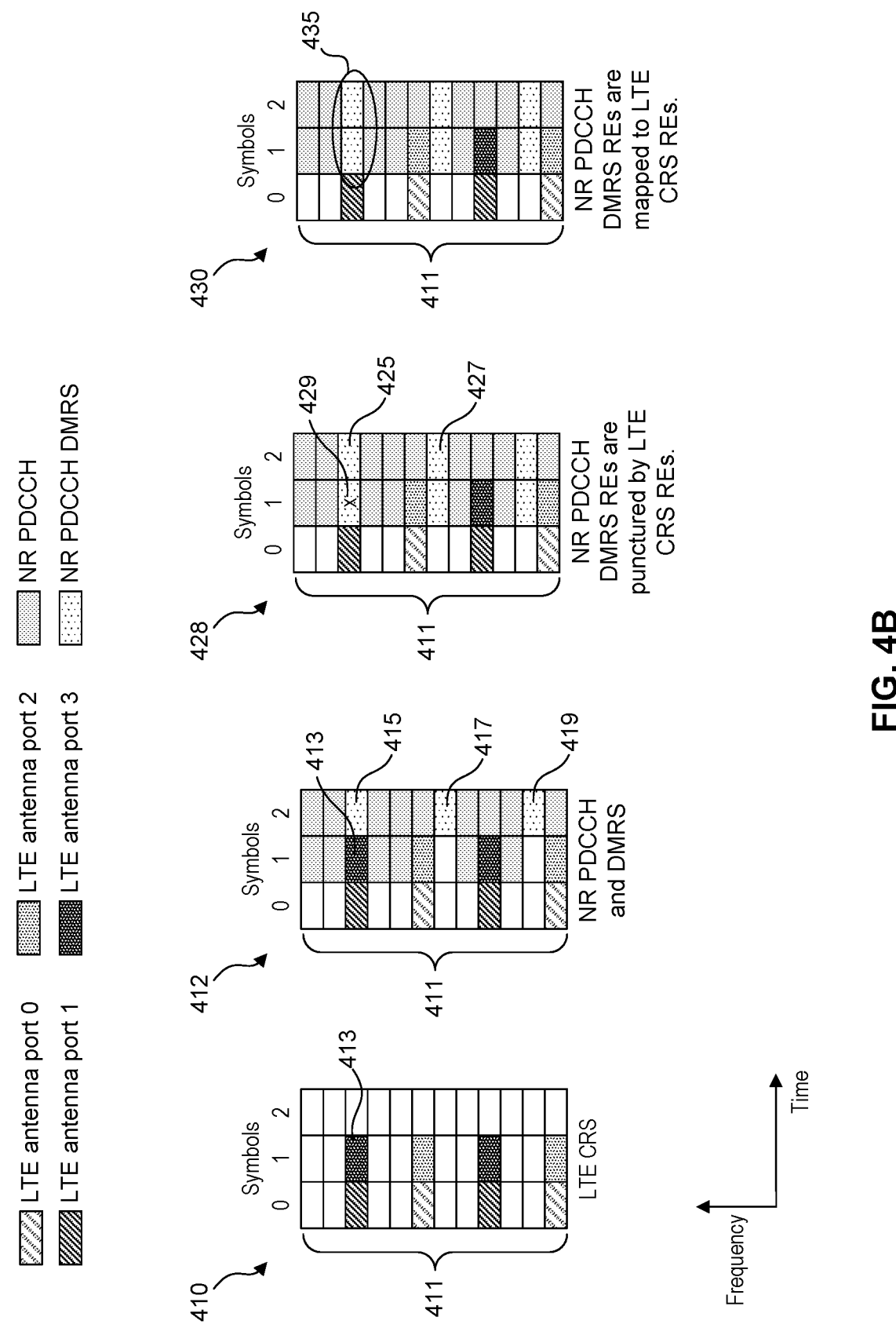

In some embodiments, various implementations can be used based on the mechanisms shown in FIG. 4B. If more than one LTE CRS rate matching patterns are configured for a UE, all configured rate matching patterns may be treated in a same way.

In some embodiments, NR PDCCH coded bits may not be mapped on the REs used for LTE CRS. In other embodiments, NR PDCCH DMRS REs may be mapped on a symbol that has NR PDCCH DMRS colliding with LTE CRS, similar to NR PDCCH DMRS 435 shown in example 430 of FIG. 4B. Whether the NR PDCCH DMRS is transmitted on the REs colliding with LTE CRS RE can be indicated by the base station according to UE capability. In addition, for scenario 2, in non-overlapped frequency region, the NR PDCCH and NR PDCCH DMRS can be mapped on the designated REs and NR PDCCH perform rate matching around NR PDCCH DMRS REs.

Figure 4C:
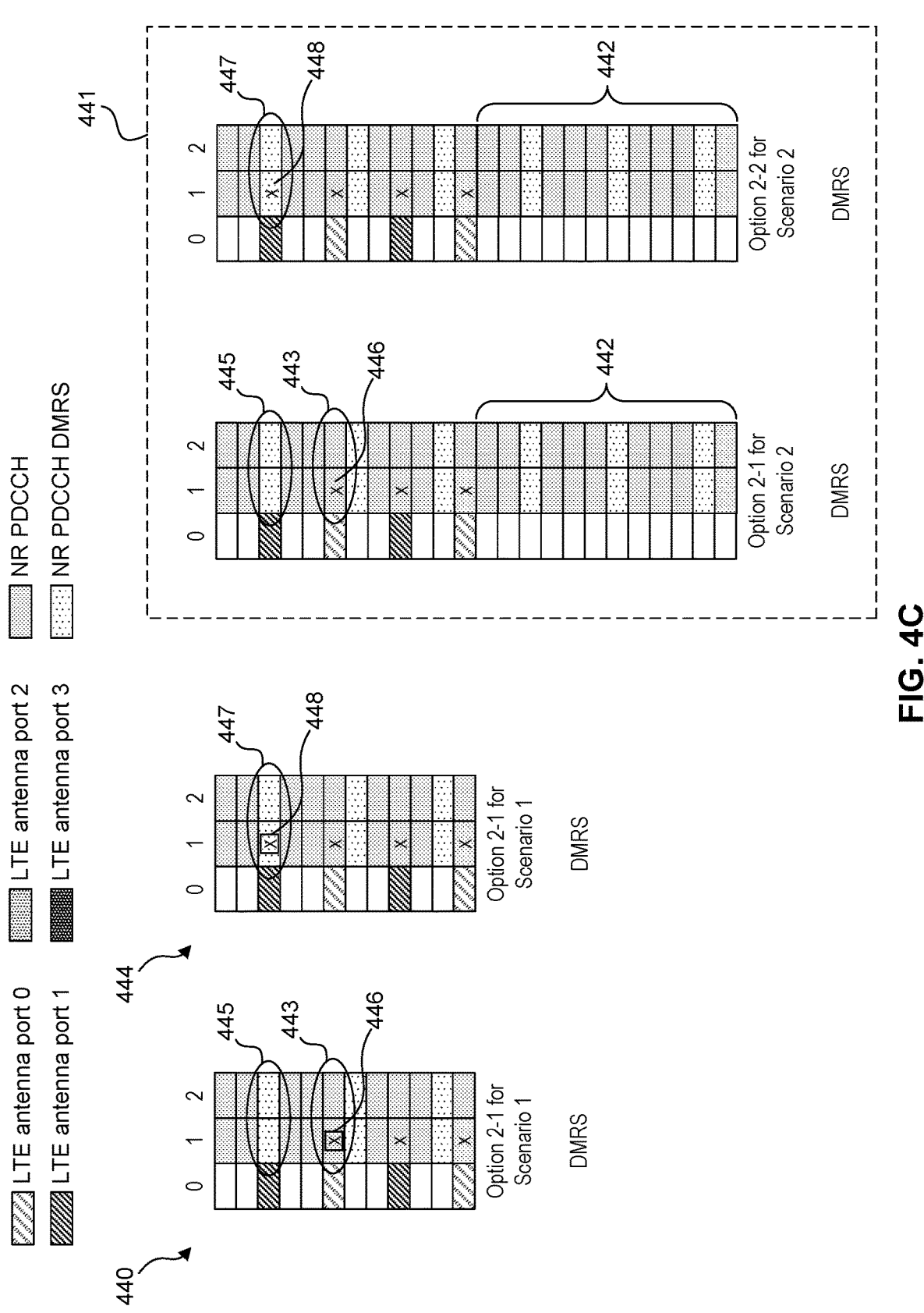

In some embodiment, NR PDCCH coded bits are not mapped on to the REs used for associated NR PDCCH DMRS, while the LTE CRS 446 punctures the NR PDCCH REs for NR PDCCH 443, as shown by example 440 in FIG. 4C. In some embodiments, if the NR PDCCH DMRS REs are colliding with the LTE CRS REs, the NR PDCCH DMRS 445 is assumed to be transmitted as shown in example 440 in FIG. 4C. In some embodiments, if NR PDCCH DMRS REs are overlapping with the LTE CRS RE, LTE CRS 448 puncture NR PDCCH DMRS REs for NR PDCCH DMRS 447 as shown in example 444 of FIG. 4C. In addition, for scenario 2, in non-overlapped frequency region 442, the NR PDCCH and NR PDCCH DMRS can be mapped on the designated REs and NR PDCCH perform rate matching around DMRS REs, as shown in example 441 of FIG. 4C.

In some embodiments, no NR PDCCH DMRS signal is transmitted in the symbol which collide with the LTE CRS. For example, referring to FIG. 4D, NR PDCCH DMRS 451 and 452 can span two symbols at symbol 1 and 2. However, since the LTE CRS occupies symbols 0 and 1, NR PDCCH DMRS 451 and 452 are not mapped to symbol 1, and they are mapped to become NR PDCCH DMRS 453 and 454 shown in example 457 in FIG. 4D, where NR PDCCH DMRS signals in symbol #1 are not transmitted. Similarly, NR PDCCH 455 occupies symbols 1 and 2, but only transmitted at symbol 2 to become NR PDCCH 456 as shown in example 457, while NR PDCCH DMRS signals in symbol #1 are not transmitted. In some embodiments, the LTE CRS punctures NR PDCCH REs for NR PDCCH. In some embodiments, the NR PDCCH REs are not mapped on REs used for LTE CRS, DMRS signals in symbol #1 are not transmitted. In some embodiments, LTE CRS punctures NR PDCCH REs, NR PDCCH DMRS REs in symbol #1 are not used by PDCCH transmission in overlapped region. In addition, in an non-overlapped region 459, the NR PDCCH and NR PDCCH DMRS can be mapped on the designated REs and NR PDCCH perform rate matching around DMRS REs as shown in example 458.

In some embodiments, NR PDCCH DMRS signals may not be transmitted in frequency region overlapped with LTE CRS. In some embodiments, NR PDCCH coded bits or NR PDCCH DMRS are not mapped on LTE CRS REs in symbol #1, as shown in FIG. 4E. As shown in FIG. 4E, NR PDCCH DMRS 463 and 466 can span two symbols at symbol 1 and 2, while NR PDCCH DMRS 463 collides with LTE CRS 462, and NR PDCCH DMRS 466 does not collide with any LTE CRS. Similarly, NR PDCCH 464 and 465 can span two symbols at symbol 1 and 2, while NR PDCCH 465 collides with LTE CRS 461, and NR PDCCH 464 does not collide with any LTE CRS. After the mapping, as shown in example 470, NR PDCCH DMRS 463 and 466 become NR PDCCH DMRS 471 and 474, respectively, occupying only symbol 2 without occupying any REs in symbol #1. Similarly, after the mapping, as shown in example 470, NR PDCCH 464 and 465 become NR PDCCH 472 and 473, respectively, occupying only symbol 2 without occupying any REs in symbol #1. In addition, in an non-overlapped region 475, the NR PDCCH and NR PDCCH DMRS can be mapped on the designated REs and NR PDCCH perform rate matching around DMRS REs as shown in example 470.

Figure 4D:
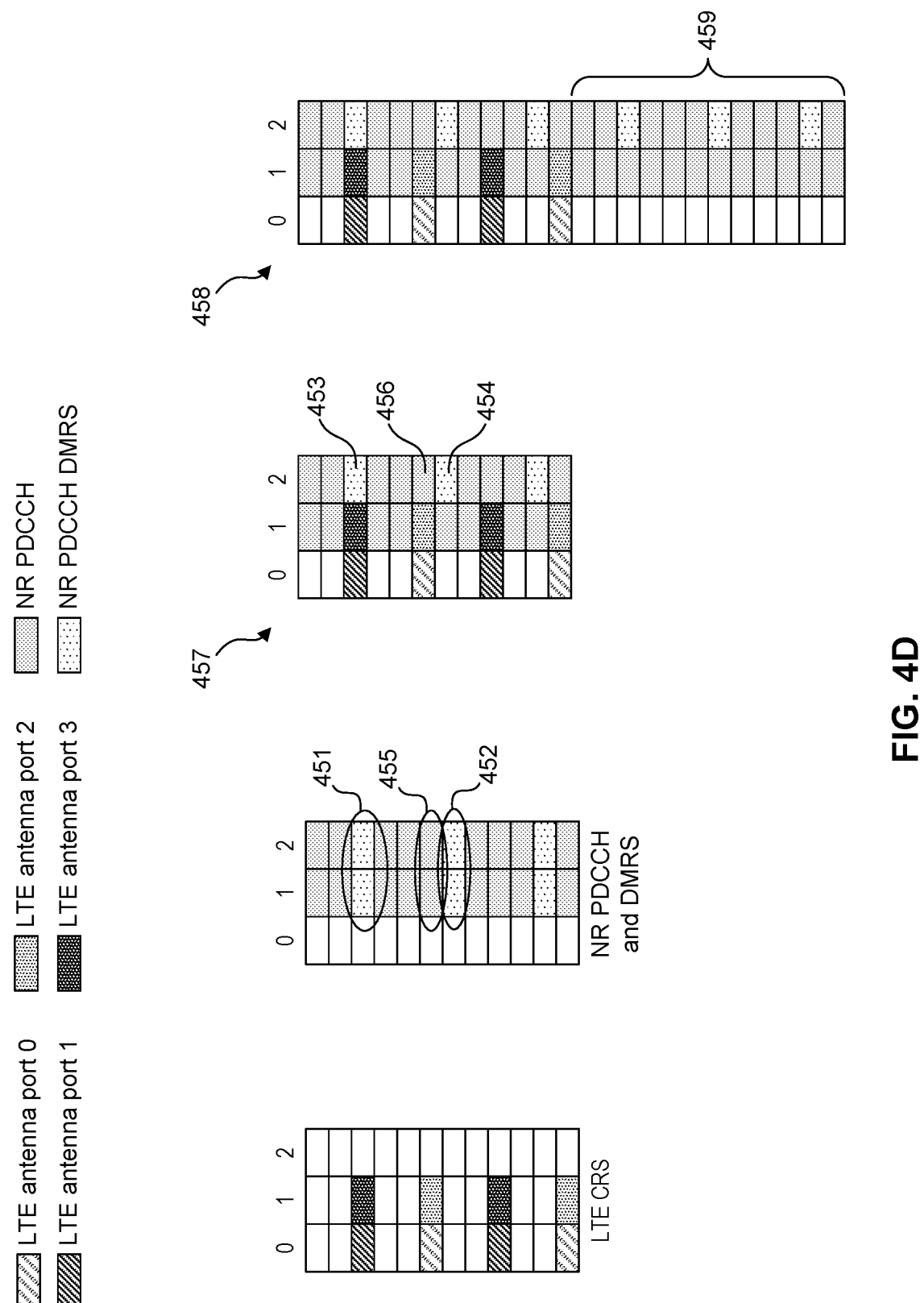
Figure 4E:
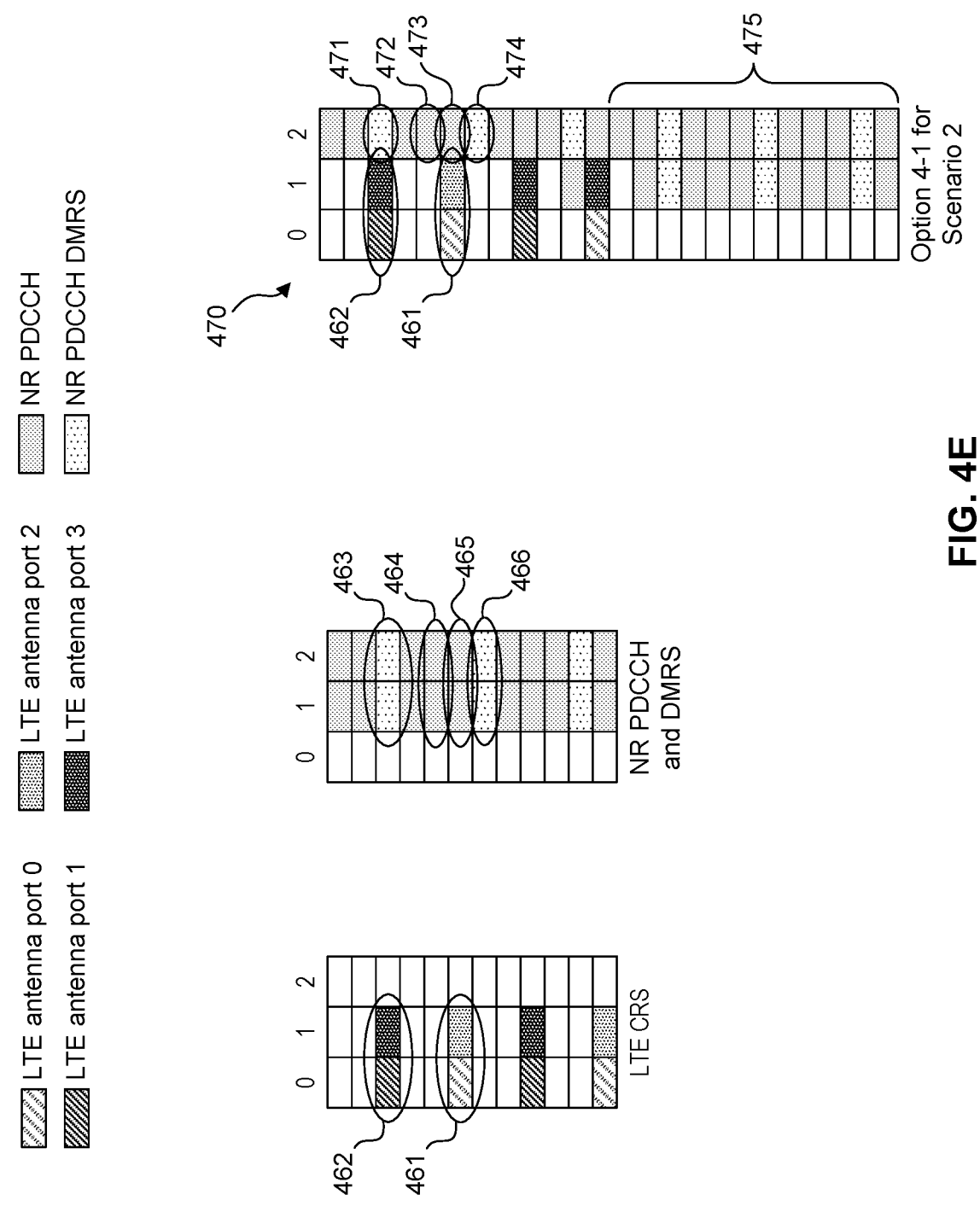

Various situations shown in FIGS. 4C-4E are selected from different combinations of cases shown in FIG. 4B. There can be more combinations based on the cases shown in FIG. 4B, which are not shown.

Referring back to FIG. 3, in some embodiments, optionally, at 311, a base station can receive a UE capability report from the UE. Operations at 311 can be performed at various points of time, such as before operations performed at 301, or other points of time. In some embodiments, the UE capability report may include a capability to support different sizes of LTE bandwidth and the NR PDCCH CORESET, a capability to support one or two overlapping LTE CRS rate matching patterns in the PDCCH CORESET, a capability to support maximum non-overlapping CRS rate matching patterns in the PDCCH CORESET, and a UE channel estimation capability. In some embodiments, the UE channel estimation capability can include a capability for the UE to support a NR PDCCH DMRS only in a clean symbol, a capability for the UE to support the NR PDCCH DMRS in a clean symbol and a polluted NR PDCCH DMRS contained in a colliding symbol including both the NR PDCCH DMRS and a LTE CRS, a capability for the UE to support puncturing the polluted NR PDCCH DMRS in channel estimation, a capability for the UE to use all NR PDCCH DMRS REs for channel estimation including the polluted DMRS REs, and a capability for the UE to use all NR PDCCH DMRS REs for channel estimation including cancelling the LTE CRS for polluted NR PDCCH DMRS REs.

Figure 5:
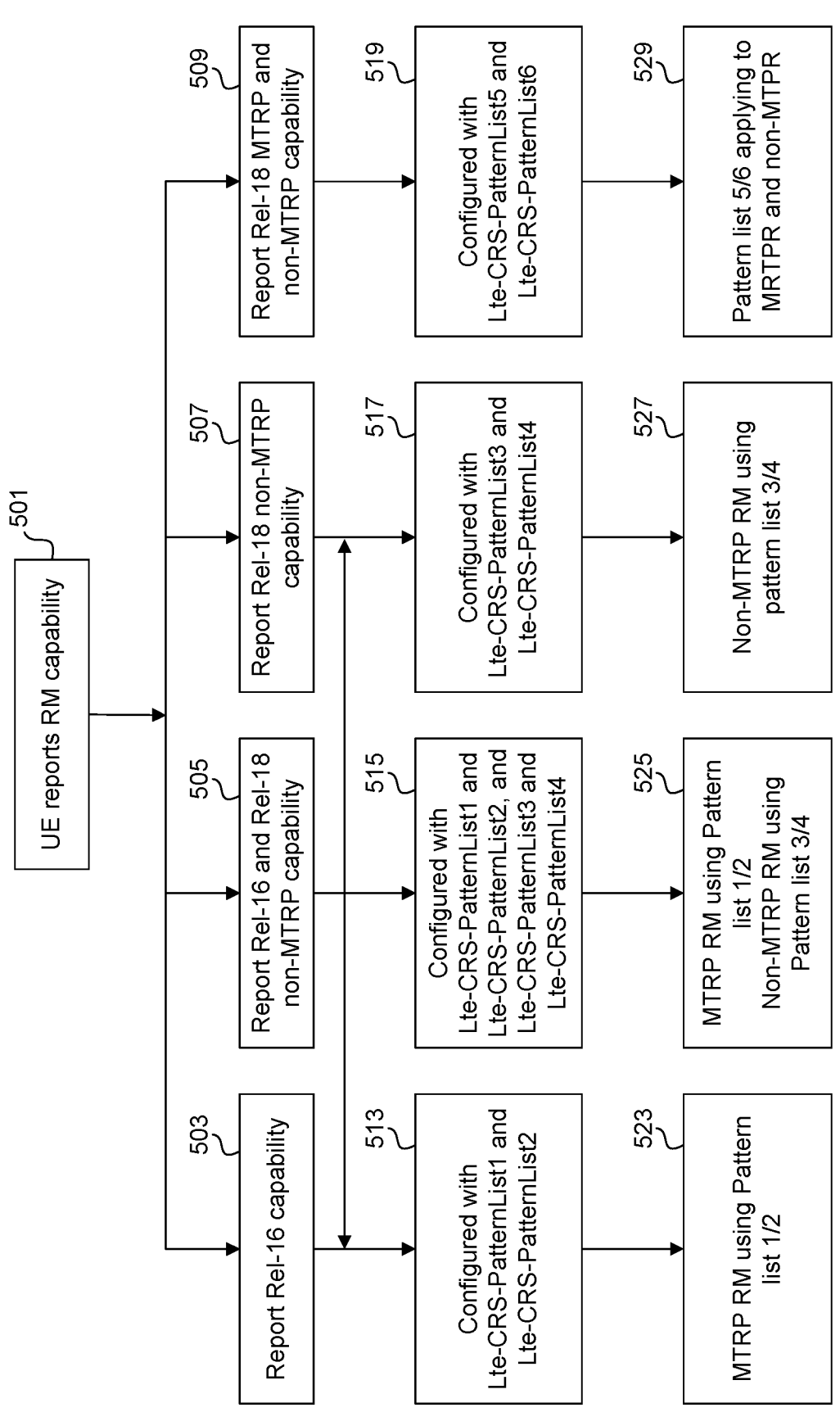
FIG. 5 illustrates an example for a UE to report UE capacity to support DSS between NR and LTE in a wireless communication system, according to some aspects of the disclosure.

Some embodiments may provide two Rel-18 UE rate matching (RM) capabilities for supporting two overlapping LTE CRS rate matching patterns. Under a first capability, two overlapping LTE CRS rate matching patterns for non-MTRP scenario can be provided. Two parameters, lte-CRS-PatternList3 and lte-CRS-PatternList4, can be configured for a UE having the first capability. Accordingly, a UE having the first capability can simultaneously configure with lte-CRS-PatternList1 and lte-CRS-PatternList2, and lte-CRS-PatternList3 and lte-CRS-PatternList4 according to reported Rel-16 and Rel-18 RM capabilities. In some embodiments, a UE can have a second capability to support two overlapping LTE CRS rate matching patterns for both MTRP and non-MTRP scenarios. Two parameters, lte-CRS-Pattern-List5 and lte-CRS-PatternList6, can be configured for the UE having the second capability. For the UE having the second capability, the UE cannot simultaneously configure with lte-CRS-PatternList1 and lte-CRS-PatternList2, and lte-CRS-PatternList5 and lte-CRS-PatternList6, lte-CRS-PatternList5 and lte-CRS-PatternList6 are applied to both MTRP and non-MTRP scenarios. In some embodiments, a UE can report the RM capability and a base station can configure its functions based on the configuration flow shown in FIG. 5.

At 501, UE may report rate matching capability, which may be classified into various cases. At 503, a Rel-16 capability is reported; at 505, a Rel-16 and Rel-18 non-MTRP capability are reported; at 507, Rel-18 non-MTRP capability is reported; and at 509, Rel-18 MTRP and non-MTRP capability are reported. Accordingly, following the capability report, various configuration can be performed. At 513, the base station can configure lte-CRS-PatternList1 and lte-CRS-PatternList2; further at 523, followed by MTRP rate matching using pattern list 1 or 2. At 515, the base station can configure lte-CRS-PatternList 1, lte-CRS-PatternList2, lte-CRS-PatternList3, and lte-CRS-PatternList4; further at 525, followed by MTRP rate matching using pattern list 1 or 2, or non-MTRP rate matching using pattern list 3 or 4. At 517, the base station can configure lte-CRS- PatternList3 and lte-CRS-PatternList4; further at 527, followed by non-MTRP rate matching using pattern list 3 or 4. Similarly, at 519, the base station can configure lte-CRS-PatternList5 and lte-CRS-PatternList6; further at 527, followed by MTPR and non-MTRP rate matching using pattern list 5 or 6.

Figure 6:
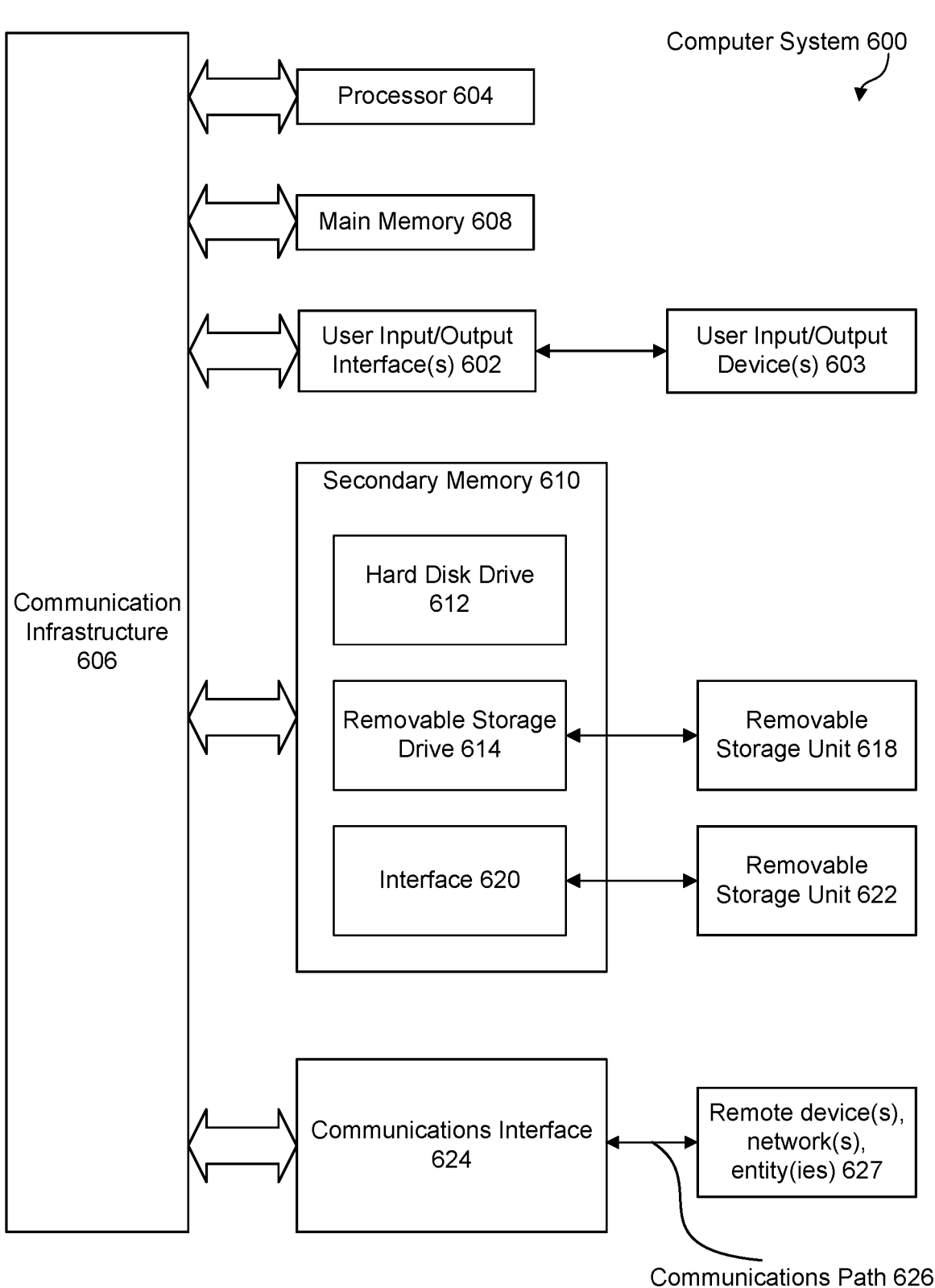
FIG. 6 is an example computer system for implementing some aspects or portion(s) thereof of the disclosure provided herein.

Various aspects can be implemented, for example, using one or more computer systems, such as computer system 600 shown in FIG. 6. Computer system 600 can be any computer capable of performing the functions described herein such as UE 101, base station 103, base station 105, or base station 133 as shown in FIGS. 1A and 1B, and FIG. 2A, for operations described for processor 209 or process 300. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 608, the removable storage unit 618, the removable storage unit 622 can store instructions that, when executed by processor 604, cause processor 604 to perform operations for a UE or a base station, e.g., UE 101, base station 103, base station 105, or base station 133 as shown in FIGS. 1A and 1B, and FIG. 2A, for operations described for processor 209 or process 300.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626. Operations of the communication interface 624 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth bellow in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific consid- erations. For instance, in the US, collection of, or access to, certain health data may be governed by federal and/or state laws, such as the Health Insurance Portability and Account- ability Act (HIPAA); whereas health data in other countries may be subject to other regulations and policies and should be handled accordingly. Hence different privacy practices should be maintained for different personal data types in each country.

What is claimed is:

1. A method for wireless communications by a base station with a user equipment (UE) in a wireless system, comprising:

determining whether a new radio (NR) physical downlink control channel (PDCCH) control resource set (CORE- SET) and a Long Term Evolution (LTE) PDCCH frequency range are partially overlapped in a frequency domain of the NR including a first frequency region of the NR and a second frequency region of the NR, wherein the partial overlap occurs when the LTE PDCCH frequency range overlaps with the NR PDCCH CORESET in the first frequency region of the frequency domain of the NR without overlapping with the NR PDCCH CORESET in the second frequency region of the frequency domain of the NR, and wherein the wireless system supports dynamic spectrum sharing (DSS) between NR radio access technology (RAT) for the UE and LTE RAT for the UE;

in response to a determination that the partial overlap occurs, mapping a NR PDCCH or a NR PDCCH demodulation reference signal (DMRS) to resource elements in the second frequency region, and mapping an LTE cell-specific reference signal (CRS) to a symbol carrying the LTE CRS in the first frequency region; and transmitting the NR PDCCH or the NR PDCCH DMRS to the UE on the resource elements in the second frequency region, and transmitting the LTE CRS to the UE in the symbol in the first frequency region.

2. The method of claim 1, wherein no NR PDCCH DMRS is transmitted in the first frequency region when the LTE CRS to the UE is transmitted.

3. The method of claim 1, wherein no NR PDCCH DMRS is transmitted in the symbol carrying the LTE CRS in the first frequency region.

4. The method of claim 1, wherein the NR PDCCH DMRS is a first NR PDCCH DMRS, and the method further comprises:

mapping a second NR PDCCH DMRS to the symbol carrying the LTE CRS in the first frequency region, wherein resource elements of the symbol for the LTE CRS puncture resource elements for the second NR PDCCH DMRS colliding with the resource elements of the symbol for the LTE CRS in the symbol.

5. The method of claim 4, wherein the method further comprises:

determining whether to transmit the second NR PDCCH DMRS on resource elements overlapping with LTE CRS based on a capability of the UE; and indicating to the UE the second NR PDCCH DMRS is transmitted to the UE in the symbol carrying the LTE CRS in the first frequency region.

6. The method of claim 1, wherein the mapping the NR PDCCH DMRS to resource elements in the second fre- quency region comprises mapping the NR PDCCH DMRS to resource elements in a symbol different from the symbol carrying the LTE CRS transmission.

7. The method of claim 1, wherein the transmitting the LTE CRS in the symbol in the first frequency region comprises transmitting the LTE CRS in the symbol without mapping any NR PDCCH RE in the symbol.

8. The method of claim 1, wherein the NR PDCCH is a first NR PDCCH, and the method further comprises:

mapping a second NR PDCCH to the symbol carrying the LTE CRS in the first frequency region; and transmitting the LTE CRS in the symbol in the first frequency region together with the second NR PDCCH resource element in the symbol, wherein the LTE CRS resource elements puncture NR PDCCH resource ele- ments in the symbol.

9. The method of claim 8, wherein the second NR-PDCCH spans at least 2 consecutive symbols with at least 1 symbol not overlapping with LTE-CRS REs.

10. The method of claim 1, further comprising:

receiving a UE capability report from the UE, wherein the UE capability report includes a capability to support different sizes of LTE bandwidth and the NR PDCCH CORESET, a capability to support one or two overlapping LTE CRS rate matching patterns in PDSCH transmission or the PDCCH CORESET, a capability to support two non-overlapping CRS rate matching patterns in the PDCCH CORESET, and a UE channel estimation capability.

11. The method of claim 10, wherein the UE channel estimation capability comprises:

a capability for the UE to support a NR PDCCH DMRS only in a clean symbol;

a capability for the UE to support the NR PDCCH DMRS in a clean symbol and a polluted NR PDCCH DMRS contained in a colliding symbol including both the NR PDCCH DMRS and a LTE CRS;

a capability for the UE to support puncturing the polluted NR PDCCH DMRS in channel estimation;

a capability for the UE to use all NR PDCCH DMRS REs for channel estimation including the polluted DMRS REs; and a capability for the UE to use all NR PDCCH DMRS REs for channel estimation including cancelling the LTE CRS for polluted NR PDCCH DMRS RES.

12. The method of claim 10, wherein the capability to support two-overlapping CRS rate matching patterns for PDSCH transmission comprises:

a capability for supporting two overlapping LTE CRS rate matching patterns based on at least 4 parameter lists; and a capability for supporting two overlapping LTE CRS rate matching patterns based on at least 2 parameter lists.

13. A base station, comprising:

a transceiver configured to communicate with a user equipment (UE) in a wireless system, wherein the wireless system supports dynamic spectrum sharing (DSS) between new radio (NR) radio access technology (RAT) for the UE and Long Term Evolution (LTE) RAT for the UE; and a processor communicatively coupled to the transceiver and configured to:

determine whether a NR physical downlink control channel (PDCCH) control resource set (CORESET) and a LTE PDCCH frequency range are partially overlapped in a frequency domain of the NR including a first frequency region of the NR and a second frequency region of the NR, wherein the partial overlap occurs when the LTE PDCCH frequency range overlaps with the NR PDCCH CORESET in the first frequency region of the frequency domain of the NR without overlapping with the NR PDCCH CORESET in the second frequency region of the frequency domain of the NR;

in response to a determination that the partial overlap occurs, map a NR PDCCH or a NR PDCCH demodulation reference signal (DMRS) to resource elements in the second frequency region, and map an LTE cell-specific reference signal (CRS) to a symbol carrying the LTE CRS in the first frequency region; and transmit the NR PDCCH or the NR PDCCH DMRS to the UE on the resource elements in the second frequency region, and transmit the LTE CRS to the UE in the symbol in the first frequency region.

14. The base station of claim 13, wherein no NR PDCCH DMRS is transmitted in the first frequency region when the LTE CRS to the UE is transmitted.

15. The base station of claim 13, wherein no NR PDCCH DMRS is transmitted in the symbol carrying the LTE CRS in the first frequency region.

16. The base station of claim 13, wherein the NR PDCCH DMRS is a first NR PDCCH DMRS, and the processor is further configured to map a second NR PDCCH DMRS to the symbol carrying the LTE CRS in the first frequency region, wherein resource elements of the symbol for the LTE CRS puncture resource elements for the second NR PDCCH DMRS colliding with the resource elements of the symbol for the LTE CRS in the symbol.

17. The base station of claim 16, wherein the processor is further configured to:

determine whether to transmit the second NR PDCCH DMRS on resource elements overlapping with LTE CRS based on a capability of the UE; and indicate to the UE the second NR PDCCH DMRS is transmitted to the UE in the symbol carrying the LTE CRS in the first frequency region.

18. The base station of claim 13, wherein the NR PDCCH is a first NR PDCCH, and the processor is further configured to:

map a second NR PDCCH to the symbol carrying the LTE CRS in the first frequency region; and transmit the LTE CRS in the symbol in the first frequency region together with the second NR PDCCH resource element in the symbol, wherein the LTE CRS resource elements puncture NR PDCCH resource elements in the symbol.

19. A non-transitory computer-readable medium storing instructions that, when executed by a processor of a base station, cause the base station to perform operations, the operations comprising:

determining whether a new radio (NR) physical downlink control channel (PDCCH) control resource set (CORESET) and a Long Term Evolution (LTE) PDCCH frequency range are partially overlapped in a frequency domain of the NR including a first frequency region of the NR and a second frequency region of the NR, wherein the partial overlap occurs when the LTE PDCCH frequency range overlaps with the NR PDCCH CORESET in the first frequency region of the frequency domain of the NR without overlapping with the NR PDCCH CORESET in the second frequency region of the frequency domain of the NR, and wherein a wireless system including the base station and a user equipment (UE) supports dynamic spectrum sharing (DSS) between NR radio access technology (RAT) for the UE and LTE RAT for the UE;

in response to a determination that the partial overlap occurs, mapping a NR PDCCH or a NR PDCCH demodulation reference signal (DMRS) to resource elements in the second frequency region, and mapping an LTE cell-specific reference signal (CRS) to a symbol carrying the LTE CRS in the first frequency region; and transmitting the NR PDCCH or the NR PDCCH DMRS to the UE on the resource elements in the second frequency region, and transmitting the LTE CRS to the UE in the symbol in the first frequency region.

20. The non-transitory computer-readable medium of claim 19, wherein no NR PDCCH DMRS is transmitted in the first frequency region where the LTE CRS to the UE is transmitted.

\* \* \* \* \*